J. F. OWENS.
DUST SHIELD FOR TRANSPLANTERS.
APPLICATION FILED APR. 5, 1917.

1,316,921.

Patented Sept. 23, 1919.

Inventor
J. F. OWENS.

By T. Randolph Jr.
Attorney

UNITED STATES PATENT OFFICE.

JONAH F. OWENS, OF STANTONSBURG, NORTH CAROLINA.

DUST-SHIELD FOR TRANSPLANTERS.

1,316,921.   Specification of Letters Patent.   Patented Sept. 23, 1919.

Application filed April 5, 1917. Serial No. 160,006.

*To all whom it may concern:*

Be it known that I, JONAH F. OWENS, a citizen of the United States, residing at Stantonsburg, in the county of Wilson and State of North Carolina, have invented certain new and useful Improvements in Dust-Shields for Transplanters; and I do hereby declare the following to be a full, clear, and exact description of the invention, such as will enable others skilled in the art to which it appertains to make and use the same.

This invention relates to transplanting machines, such as are commonly employed for planting cabbage, tobacco plants, or other analogous plants, and the primary object of the invention is to provide a dust shield which is attached to the planter in front of the operator of the same, so as to protect the operator from dirt stirred up by the travel of the transplanting machine.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings, wherein like characters designate like and corresponding parts throughout the several views, and in which:—

Figure 1:
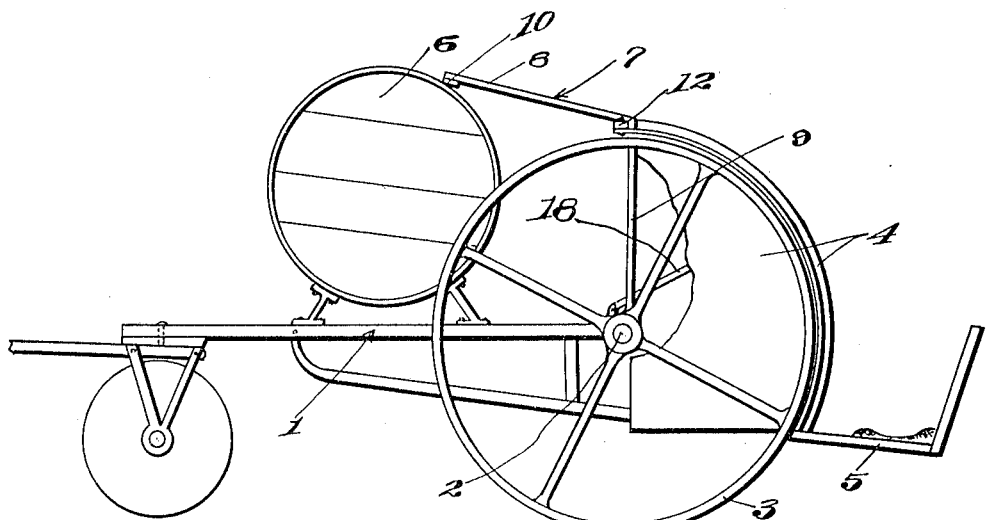
Figure 2:
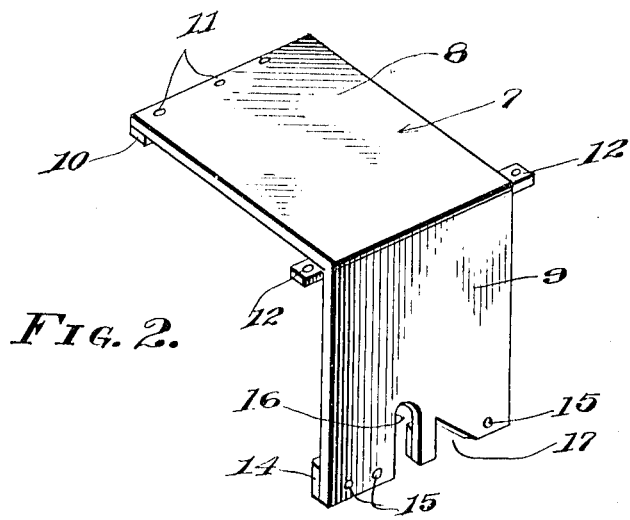

Figure 1 is a side elevation of an ordinary transplanter, showing the improved dust shield applied thereto; and Fig. 2 is a perspective view of the dust shield.

Referring more particularly to the drawings, 1 designates the transplanting machine as an entirety, which includes a rear supporting axle 2 upon which the usual type of supporting wheels 3 are mounted. Suitable mud guards 4 are provided which extend partially about the rear side of the supporting wheels 3 and are provided for protecting the operator who is seated upon the seat 5, from mud, or dirt, which might be thrown up by the rotation of the supporting wheels 3. The usual type of barrel or water container 6 is carried by the transplanter for supplying the necessary water at the time of transplanting the plants.

The dust shield, which is generically indicated by the numeral 7 is composed of an angular plate having a substantially horizontal portion 8 and a vertical portion 9. The substantially horizontal portion 8 has a reinforcing rib or strip 10 attached to its under surface at its upper forward end, which strip, is secured in any suitable manner, such as by insertion of screws through the openings 11, to the barrel 6.

A bar 12 is attached to the inner surface of the dust shield 7 at the angle of the same and it projects beyond the edges of the dust shield as clearly shown in Fig. 2 of the drawings. The bar 12 is attached in any suitable manner, to the upper forward end of the mud guard 4. The lower edge of the vertical portion of the dust shield is attached in any suitable manner, such as by the provision of bolts which are inserted through the openings 15, to the axle 2, thereby providing a dust shield which will prevent dust stirred up by the draft animals pulling the transplanter or by the transplanter itself, from flying in the face of the operator of the machine who is seated upon the seat 5.

The vertical side 9 is provided with an upwardly extending recess or slot 16 which communicates with its lower edge and is provided for permitting of the unimpeded movement of the hand lever 18 of the transplanter construction. The side 9 is also provided with a substantially triangularly shaped recess 17 which is provided to permit of the operation of the hand slide of the transplanter.

In reducing the invention to practice, certain minor features of construction, combination and arrangement of parts may necessitate alterations to which the patentee is entitled, provided such alterations are comprehended within the scope of what is claimed.

What is claimed is:—

1. The combination with a vehicle including a frame, supporting wheels at opposite sides of the frame, mud guard housings positioned about the rear portion of the wheel and a driver's platform positioned adjacent the rear end of the frame and between the wheels, of a dust guard having a vertically extending section and a horizontally extending section leading from the upper end of the vertical section, a cross bar at the rear end of the horizontal section and upper end of the vertical section extending to provide end portions for connection with the mud guard, the lower end portion of the vertical section being secured to the frame and the forward end portion of the horizontal section being supported in an extended position.

2. A dust guard of the character described comprising a vertical section and a horizontal section extending forwardly from the upper end of the vertical section, a cross bar extending beneath the rear end portion of the horizontal section at the upper end of the vertical section and extending beyond the sides of the sections, the lower portion of said vertical section being provided with cutouts.

In testimony whereof I affix my signature in presence of two witnesses.

JONAH F. OWENS.

Witnesses:
C. R. SHELTON,
T. F. PETTUS.

Copies of this patent may be obtained for five cents each, by addressing the "Commissioner of Patents, Washington, D. C."